US008115670B2

(12) United States Patent
Klein et al.

(10) Patent No.: US 8,115,670 B2
(45) Date of Patent: Feb. 14, 2012

(54) METHOD OF VERIFIABLY DETECTING THE SPEED OF A VEHICLE

(75) Inventors: Christoph Klein, Bad Endbach (DE); Andreas Behrens, Langenfeld (DE); Bernhard Dohmann, Langenfeld (DE); Norbert Terlau, Kuerten (DE)

(73) Assignee: Robot Visual Systems GmbH, Monheim (DE)

( * ) Notice: Subject to any disclaimer, the term of this patent is extended or adjusted under 35 U.S.C. 154(b) by 204 days.

(21) Appl. No.: 12/118,275

(22) Filed: May 9, 2008

(65) Prior Publication Data

US 2008/0278365 A1 Nov. 13, 2008

(30) Foreign Application Priority Data

May 7, 2007 (DE) .......................... 10 2007 022 373

(51) Int. Cl.
*G01S 13/91* (2006.01)
*G01S 13/58* (2006.01)
(52) U.S. Cl. ........... 342/107; 342/66; 340/936; 340/937
(58) Field of Classification Search .................... 342/107
See application file for complete search history.

(56) References Cited

U.S. PATENT DOCUMENTS

| | | | | |
|---|---|---|---|---|
| 3,754,253 A | * | 8/1973 | Balsiger | 342/66 |
| 4,717,915 A | * | 1/1988 | Goede | 342/66 |
| 4,743,908 A | | 5/1988 | Brassfield et al. | |
| 4,866,438 A | * | 9/1989 | Knisch | 340/936 |
| 5,041,828 A | * | 8/1991 | Loeven | 340/937 |
| 5,381,155 A | * | 1/1995 | Gerber | 342/104 |
| 5,402,346 A | | 3/1995 | Lion et al. | |
| 5,912,822 A | * | 6/1999 | Davis et al. | 702/143 |
| 5,935,190 A | * | 8/1999 | Davis et al. | 701/119 |
| 5,948,038 A | * | 9/1999 | Daly et al. | 701/117 |
| 6,160,494 A | * | 12/2000 | Sodi et al. | 340/936 |
| 6,212,468 B1 | * | 4/2001 | Nakayama et al. | 701/117 |
| 6,266,627 B1 | | 7/2001 | Gatsonides | |

(Continued)

FOREIGN PATENT DOCUMENTS

| | | |
|---|---|---|
| DE | 103 39 954 A1 | 3/2005 |
| DE | 10 2004 040 015 B4 | 12/2006 |
| EP | 0 350 751 A2 | 1/1990 |
| EP | 0 497 093 A2 | 8/1992 |
| EP | 0 588 687 A1 | 3/1994 |

(Continued)

OTHER PUBLICATIONS

Sato, Y.;, "Radar Speed Monitoring System," Vehicle Navigation and Information Systems Conference, 1994. Proceedings., 1994 , pp. 89-93, Aug. 31-Sep. 2, 1994.*

*Primary Examiner* — Thomas Tarcza
*Assistant Examiner* — Matthew M Barker
(74) *Attorney, Agent, or Firm* — Duane Morris LLP

(57) ABSTRACT

A method of measuring the speed of a vehicle wherein the speed and the distance of the vehicle from a radar system and/or the measuring angle of the vehicle relative to the radar axis is determined by means of a radar measurement so as to characterize or determine the vehicle lane of the vehicle by means of the distance and/or the measuring angle. Knowledge of the vehicle lane makes it possible to unequivocally identify the detected vehicle in a group of vehicles unequivocally.

12 Claims, 2 Drawing Sheets

U.S. PATENT DOCUMENTS

| | | | |
|---|---|---|---|
| 6,970,102 B2 * | 11/2005 | Ciolli | 340/933 |
| 7,190,306 B2 * | 3/2007 | Janssen | 342/118 |
| 7,218,271 B2 * | 5/2007 | Aker et al. | 342/104 |
| 7,333,632 B2 * | 2/2008 | Lewiner et al. | 382/104 |
| 7,541,943 B2 * | 6/2009 | Manor | 340/937 |
| 7,680,545 B2 * | 3/2010 | Gebert | 700/1 |
| 2002/0060640 A1 * | 5/2002 | Davis et al. | 342/104 |
| 2002/0186148 A1 * | 12/2002 | Trajkovic et al. | 340/936 |
| 2004/0227661 A1 * | 11/2004 | Godsy | 342/70 |
| 2006/0033654 A1 | 2/2006 | Mende et al. | |
| 2006/0047371 A1 * | 3/2006 | Janssen | 701/1 |
| 2006/0269104 A1 * | 11/2006 | Ciolli | 382/104 |

FOREIGN PATENT DOCUMENTS

| | | |
|---|---|---|
| EP | 0 616 232 A2 | 9/1994 |
| EP | 0 933 648 A1 | 8/1999 |
| EP | 0 935 764 B1 | 3/2003 |
| EP | 1 610 279 A1 | 12/2005 |

\* cited by examiner

METHOD OF VERIFIABLY DETECTING THE SPEED OF A VEHICLE

FIELD OF THE INVENTION

The present invention relates to a method of detecting the speed of a vehicle and of verifiably linking the speed measured to the detected vehicle, as generically disclosed in the Patent Specification EP 0 935 764 B1.

BACKGROUND OF THE INVENTION

Doppler radar systems are the principal measuring instruments used to control and enforce legal speed limits for vehicles.

For such instruments to be approved for the intended use, it must be ensured and demonstrated that the speed measured is correct, on the one hand, and it must be possible to link the speed measured beyond doubt to the detected vehicle, on the other hand.

The present invention relates to a method which solves, in particular, the problem of establishing such a link beyond doubt but which, in this context, also makes the speed measured plausible.

The fact that there are measuring situations in which it is not possible to link, beyond doubt, the speed measured to the detected vehicle is, in particular, attributable to the principle of radar technology. The radar beam generally forms a radar cone which spreads at an angle of approximately 5-10° and increases in width as the distance increases, which means that when the instrument is used on a multiple lane road, several vehicles may be within the radar cone (measuring range) at the same time.

To identify a detected vehicle, i.e., a vehicle that reflects the radar beam, beyond doubt, i.e., to recognize the detected vehicle in a group of vehicles, EP 0 93 5 764 B 1 proposes to detect, simultaneously with the speed, the distance as well and to link the vehicle by way of the detected distance to a lane.

To measure the distance by means of radar technology, it is known to use pulse radar systems and radar systems with frequency-modulated continuous wave radar signals. In both cases, the distance is not actually measured but derived from other measured variables. Thus, in the following description, any reference to measured values and to a measured speed is meant to be understood as a derived speed. This also applies to the distance and the angle.

Pulse radar systems determine the distance by way of measuring the travel time and require an extremely accurate time measurement in order to be able to measure the distance, i.e., the radial distance from the reflecting vehicle parts to the radar antenna. The resolution of a distance of, e.g., one meter requires a time resolution of 3.33 nsec. For high resolutions, a sequence control of the measuring process therefore entails a high degree of technical complexity.

Continuous wave radar systems determine the distance by way of the phase difference of reflected radar signals of different frequencies.

It is known that a continuous wave radar system transmits a continuous wave radar beam of constant amplitude and frequency. When reflected by a moving object, i.e., a vehicle, this radar beam undergoes a frequency shift as a function of the speed of the vehicle. The beam portion that is reflected back into the radar system or to the radar antenna is compared to the emitted radar beam, and a frequency difference, the so-called Doppler frequency, is calculated, which is proportional to the speed of the vehicle.

With the emission of a radar beam in different frequencies, frequency-shifted reflection beams are obtained, from the phase difference of which the distance is derived. The speed and the distance are thus determined in a single measuring step, which links the measured values unequivocally to each other.

In contrast to the measurement of the speed which can be measured extremely accurately with the Doppler radar principle, the range of variation of the measured distances is very large. The point reflections that come from a vehicle and arrive at the radar antenna extend to the entire vehicle contour on which the radar cross section is projected. The radar cross section that is projected onto a vehicle which moves through the radar cone changes as a function of the specific geometry of the vehicle as well as of its position in the radar cone, beginning from the moment the vehicle enters until it exits the cone. At each measuring moment, the receiver detects a sum of measured values (group of measured values) from partial reflections. Statistically, this sum, together with other parasitic reflectors, such as guard rails or metal fences, is as a rule treated as a Rayleigh distribution. Distances which scatter on the order of the width of the lane and the vehicle dimensions are measured.

An unequivocal identification of a vehicle in a group of vehicles solely on the basis of individual distances measured which are linked to a lane is not possible because of the potential ambiguities due to different reflection properties of the vehicles and potential multiple reflections.

Even if at each measuring moment a mean value is generated from the sum of the measured values, this mean value cannot always be unequivocally linked to a lane.

This is also the case if measured values outside a specified range of tolerance are ignored and the mean value is generated solely from the remaining values measured. Although this measure excludes a the risk of falsifying the average distance measured due to partial reflections from parasitic reflectors, an identification based on the mean distance measured and its link to a road is not possible for each measuring situation.

The radar system would necessarily have to be oriented at such an acute angle relative to the road so that all conceivable distances measured can be unequivocally linked only to one lane. Since due to the width of the radar cone, the vehicles necessarily move through a specific distance range, these distance ranges for two vehicles that are to be distinguished from each other, must not overlap each other. However, the distance ranges shift if the vehicles do no drive exactly in the center of the lane and will overlap every time a vehicle within the measuring range changes lanes.

This leads to measuring situations in which a vehicle cannot be unequivocally linked to a lane, which means that the lane is not a reliable characteristic for identifying a vehicle in a group of vehicles.

SUMMARY OF THE INVENTION

Thus, the problem to be solved by the present invention is to make available a method by means of which a detected vehicle in a group of vehicles can be identified regardless of features of the road or other environmental features.

This problem is solved by a method with the features of claim 1. Useful embodiments are described in the dependent claims.

BRIEF DESCRIPTION OF THE DRAWINGS

The invention will be explained in greater detail using an example and referring to the drawings, in which.

DESCRIPTION OF THE EMBODIMENTS

Figure 1:
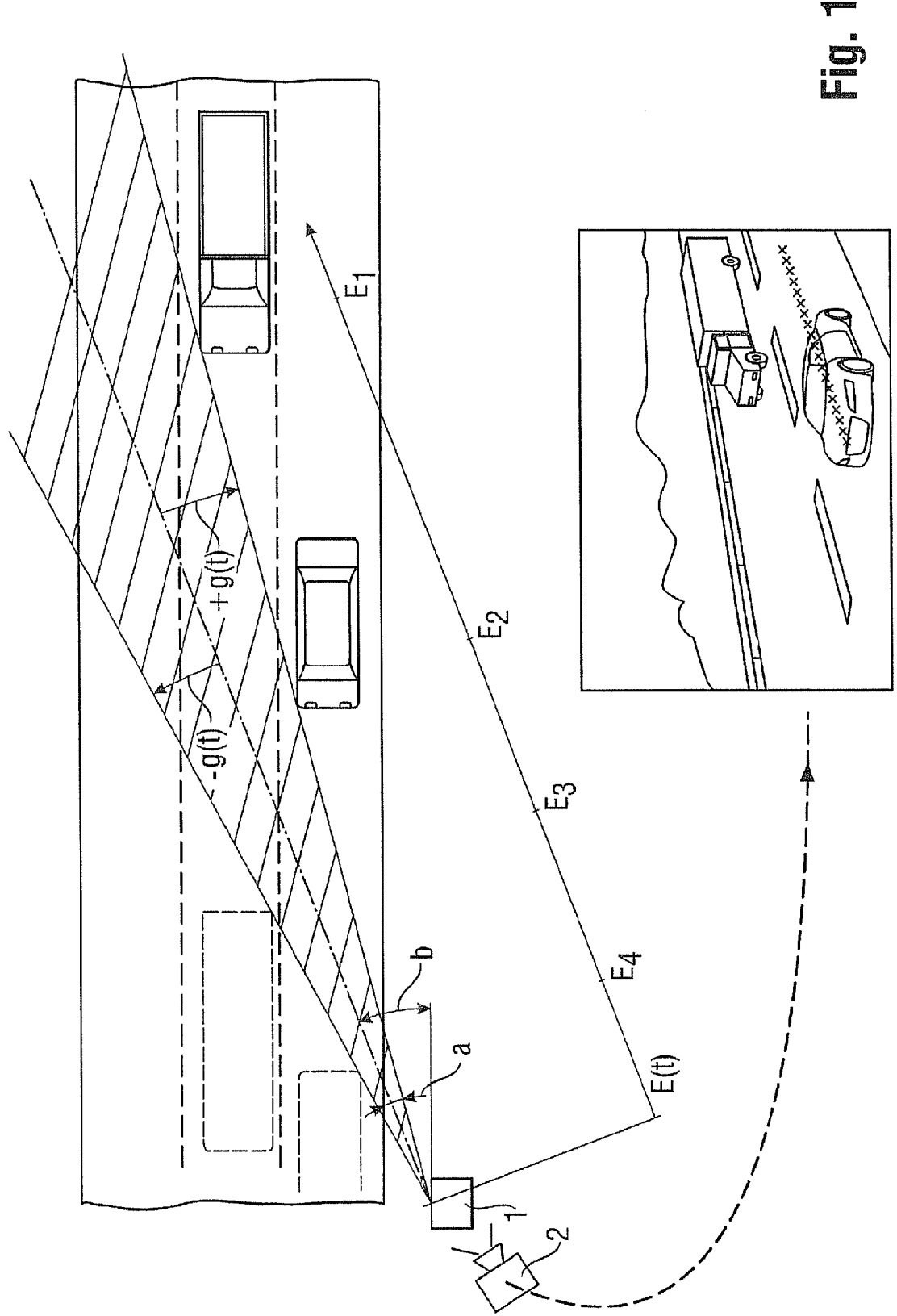
FIG. 1 illustrates a measuring arrangement in which a radar system is positioned on the side of the road.

To describe a first practical example based on FIG. 1, it will be assumed that a radar system 1 which emits a radar beam with an aperture angle α is positioned on the side of the road at an acute horizontal positioning angle β of the radar axis relative to the direction of the road on the side of a road [sic] with multiple lanes. The positioning angle β can also be formed by an angle of squint of the radar antenna.

Figure 2:
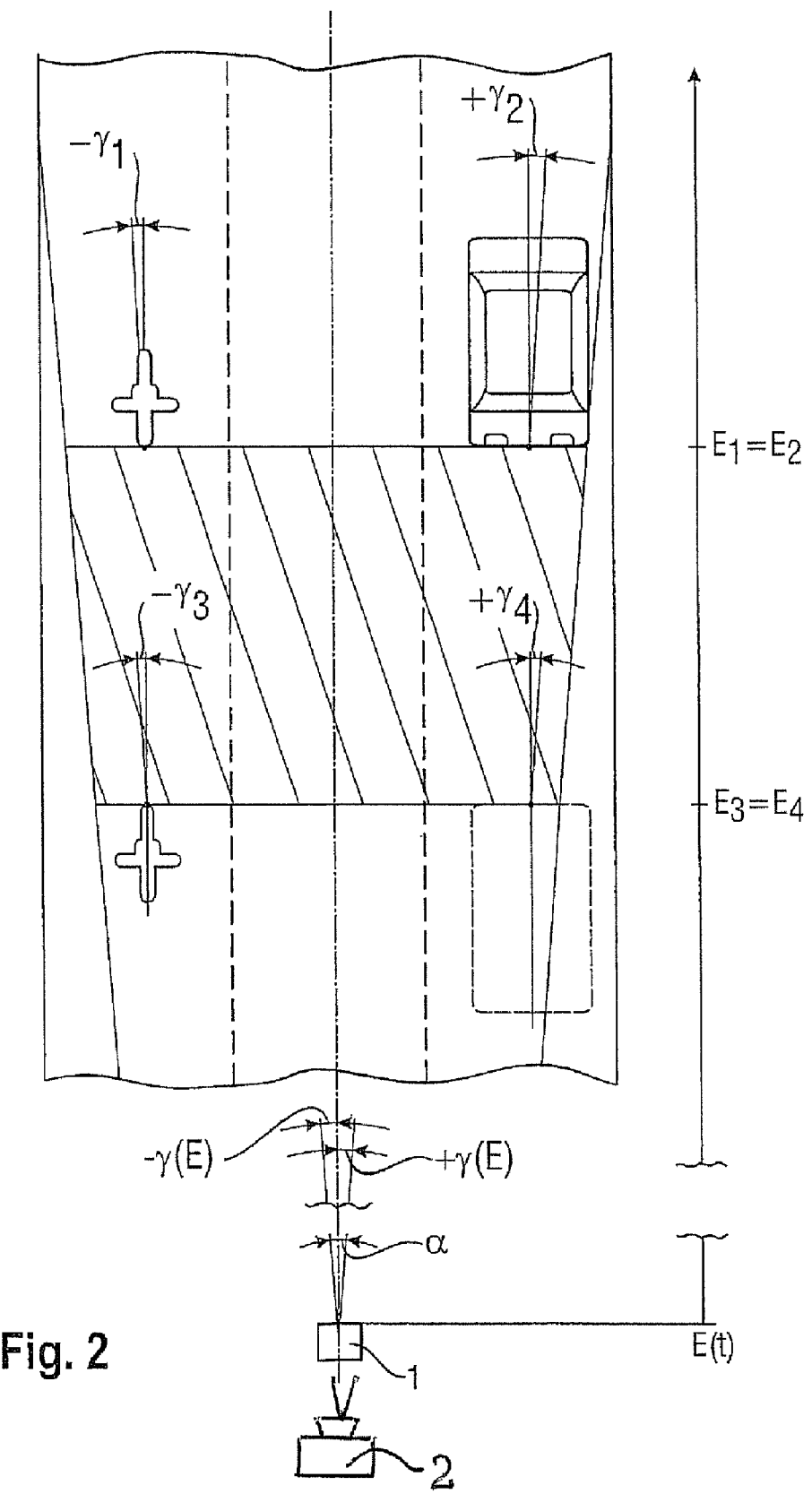
FIG. 2 illustrates a measuring arrangement in which a radar system is positioned above the road.

According to a second practical example, the radar system 1 could also be positioned above the road, e.g., on a bridge, as illustrated in FIG. 2, in which case, from a horizontal point of view, the radar axis coincides with the direction of the road.

These two fundamentally different configurations of the radar system 1 have hardly any effect on the measurement of the speed by means of the Doppler principle but differ considerably with respect to the possibility of identifying a vehicle based on its radial distance E from the radar system 1.

In the case in which the system is positioned on the side of the road as shown in FIG. 1, vehicles which do not describe an identical lane pass through different distance ranges. The distance ranges can overlap one another, which does not make an unequivocal identification based on only one distance measured possible in all cases. Only by recording a series of distance values which describes the entire distance range, through which the vehicle passes, is an unequivocal identification possible.

When the radar system 1 is positioned above the road as shown in FIG. 2, all vehicles essentially pass through the same distance range. In this case, neither individual distance values nor a series of distances which describe the entire distance range can be a distinguishing criterion.

Only by means of also recording the measuring angle γ that is enclosed by a beam portion reflected by the vehicle and the radar axis is a distinction in the second case possible at all in that by means of the angle and the distance, a position is determined in the radar cone and the position serves as the distinguishing criterion.

Although EP 0 935 764 B1 speaks of the derivation of position, what is actually meant here is the derivation of distance.

As explained above, the knowledge of the distance does not suffice to define a position in the radar cone since the distance is the same for all measuring points that are jointly located on a circular arc in the aperture angle of the radar cone.

According to the first practical example, the radar axis of the radar system 1 is oriented relative to the road direction at an acute positioning angle β, for example, of 20° relative to the road direction. At a normal aperture angle α of the radar cone of 5°-10°—e.g., in the case in which the radar system is built into the vehicle, at the distance of 2 m between the radar system 1 and the side of the road and a normal width of a lane of 3 m,—for example, a first vehicle, which enters and exists the radar cone in the center of a first lane, passes through a distance range of approximately 5 m to 30 m, and a second vehicle, which enters and exits the radar cone in the center of a second lane, passes through a distance range of approximately 25 m to 50 m. As the vehicles enter into the radar cone (measuring range), which as a rule takes place at different times, here t1 and t3, the speed v and the radial distance (distance E) of the vehicles and their angle relative to the radar axis are determined by way of the continuous measurement of the reflection signals generated on the separate vehicles.

As already described earlier, the continuous measurement of the speed and distance is carried out by using the Doppler radar effect and frequency shift keying (FSK) in the evaluation of the phase difference of reflected radar signals of different frequencies.

As illustrated in FIG. 1, a first vehicle which, driving on a first lane relative to the radar system 1, enters the radar cone at time t1 and leaves it at time t2. The distances E1 and E2 measured at the two times t1, t2 define the distance range E2-E1 over which the first vehicle passes through the radar cone. By analogy, the distances values E3 and E4 define the distance range (E4-E3) through which a second vehicle passes on a second lane. It can be very clearly seen that the distance ranges overlap each other, i.e., distances in the overlapping region by themselves are unsuitable for unequivocally linking them to one of the two vehicles. By linking the distance values to the measuring angle γ determined for this purpose, the distance is linked to a specific position which only one vehicle can occupy. Although the vehicles pass through the same measuring angle range, identical measuring angles γ will never be linked to identical distances of different vehicles.

The angle is measured, e.g., by means of two receiving antennas by way of a triangulation measurement. To this end, a planar antenna like the one described in DE 10 2004 040 015 B4 can be used.

The angle measurement is of greater significance for the second practical example.

As illustrated in FIG. 2, two vehicles driving side by side pass through a substantially identical distance range E1-E3 and E2-E4; however, they pass through different angle ranges which do not overlap each other. The angle ranges are defined by the measuring angle −γ1 and +γ2 as the vehicles enter into the radar cone at time t1 and t2 and by the measuring angle −γ3 and +γ4 as they exit the radar cone at time t3 and t4. Here, γ is a function of the distance E and is detected with a minus or plus sign.

Since the speed, the distance and the angle are derived from one measurement, the measured values can be unequivocally linked to one another.

Thus, during each measuring step, a value triple consisting of speed, distance and angle (E(t); V(t); γ(t) is obtained for each vehicle within the radar cone, with the individual values being generated, e.g., by mean value generation, from a group of measured values of partial reflections according to a Rayleigh distribution, such as they are obtained, in particular, for the distance and the angle.

By continuously repeating the measuring process (tracking algorithm), the value triples are continuously tested for plausibility by comparing the actual values with the desired values. The desired values result from the assumption that a vehicle at a constant speed drives without changing the direction of travel and from the knowledge of the time interval of the measuring steps. Individual measured values which appear implausible, i.e., speeds, distances or angles which cannot be linked to the detected vehicle at the next measuring moment, e.g., produced by multiple reflections or reflections from stationary objects, are filtered out, i.e., they are not included in the mean value generation. By continuously adjusting the desired values to the actual values, a series of value triples are obtained for the individual vehicles, which value triples represent the lane which the vehicle concerned describes.

The series of value triples, however, does not only represent the location of a lane relative to the radar system 1 but also the speed of the vehicle at each point on the lane.

The measurements are made over a period of approximately 100 msec up to several seconds, depending on the speed of the vehicle between the time it enters into and the time it exits from radar cone, e.g., at intervals of 20 msec, which allows the lanes to be identified with high accuracy.

The series of value triples determined by the radar sensor, linked to a vehicle number (this is not the license plate), to an entry time and an exit time, are fed into a computer. If during the measurement a speed is detected which exceeds the specified speed limit, the computer identifies the lane of the infringing vehicle and transmits a signal to a camera to take a shot of the traffic scene. The camera is disposed at a known stationary distance from the radar system 1 so that the optical axis is oriented at a stationary angle with respect to the radar axis.

Since the field of view of the camera extends across all lanes, across which the radar cone is directed, all vehicles that are located within the radar cone can be recorded at the time the camera (camera direction) is triggered.

To be able to identify the infringing vehicle in the photo beyond doubt, the lane in which the infringing vehicle is driving is inserted. The insertion is preferably carried out in such a manner that a marking that represents the lane is inserted over the pixels in the image, which pixels are to be linked to the positions in the field of view of the camera which define the distance and the angle and which jointly form the lane.

This means that the identification is made solely based on the lane measured relative to the radar system 1, without absolute reference to the individual lanes of the road.

Generating an absolute reference to the environment for identification is useless anyway since it assumes that only one vehicle in the measuring range at a time can be linked to the identifying feature. As already mentioned, the individual lanes cannot always be used as an identifying feature in each measuring situation since a vehicle cannot always be linked unequivocally to one lane and since only a single vehicle cannot always be linked to one lane, e.g., if a truck is following a motorcycle.

The identification of the vehicles by way of their position relative to the radar system 1 of by way of their position relative to one another could be an unequivocal distinguishing criterion if these positions were determined accurately by way of a point-by-point measurement, e.g., by means of a laser. Since such an accurate measurement is not possible with radar technology, the present invention proposed that the vehicle lane, i.e., the chronological sequence of positions detected one after the other be used as a distinguishing criterion.

For the identification, it is not necessary to insert the vehicle lane into the image. The infringing vehicle in a group of vehicles can be accurately identified during the evaluation of the image taken and the image data together with the recorded radar data. Based on the location of the recorded vehicle lanes relative to one another, on which the vehicles according to the first practical example are driving on a first and a second lane, and based on the knowledge of the orientation of the radar axis relative to the optical axis of the camera, it can be accurately concluded which vehicle lane is to be linked to which recorded vehicle. Thus, in conformity with the image in which the radar system 1 is positioned on the right side of the oncoming traffic, the vehicle with the lowest distance values is beyond doubt the vehicle that is seen on the right side of the image.

Applying the method to the second practical example in which the radar system 1 is mounted above the road, the vehicle for which a continuously larger absolute angle is measured is the vehicle that is seen closer to the edge of the image. Vehicles for which a positive measuring angle $\gamma$ is determined are located in the right half of the image while those with a negative measuring angle $\gamma$ appear in the left half of the image.

In practice, however, visually visible evidence in the image itself is more relevant, which is the reason why inserting the vehicle lane into the image is useful.

This will be more closely considered at the end of the description of a third practical example.

In a third practical example, a simpler variation of a radar system 1 will be used, which makes it possible to record during the measurements the distance E, in addition to the speed v, but not the measuring angle $\gamma$, i.e., in contrast to the first practical example, the step of measuring the angle is absent.

Even without recording the angle is it possible to obtain data for limited applications solely by measuring the distance over the duration of the passage of the vehicle through the radar cone, which data make it possible to distinguish a plurality of vehicles by their position relative to one another and relative to the radar system.

As already explained earlier, at each measuring time, a group of measured distances is detected, which distances, depending on the projection of the radar beam onto a vehicle and the contour of the vehicle, have a range of variations which also changes over the duration of the passage because of the change of the position of the vehicle relative to the radar system 1. Consequently, neither individual measured values of the group of measured values nor a mean value generated therefrom are suitable to make an accurate distinction.

According to the invention, from the values measured at successive measuring times, the measured values for individual vehicle lanes are correlated, e.g., by means of regression analysis or curve fitting to the trajectories, and measured values which cannot be unequivocally linked to a vehicle lane are eliminated. The quality of the approximation of the curves which describe the vehicle lanes increases with the number of the measurements, which also increases the reliability of the measuring results although the measured values from the continuous measurements according to the present invention are obviously as widely scattered as the values from a single measurement.

I.e., compared to a distance that is recorded only once, the distances recorded several times while the vehicle is passing through the measuring range are more reliable.

A method according to the third practical example is limited to measuring situation in which the radar system 1 is oriented at an acute positioning angle $\beta$ relative to the road or in which the antenna has an angle of squint $\beta$.

In addition to the distance values E that are recorded during the passage [of the vehicle,] especially the distances E measured as the vehicle enters and exits [the radar cone] are relevant in making an identification. At these two times, not only the distance but also the measuring angle $\gamma$ is known, which measuring angle here as the positioning angle $\beta+/-$ corresponds to half the aperture angle $\alpha$ of the radar cone.

According to a fourth practical example, the vehicle lane is to be identified based solely on the values measured for the measuring angle $\gamma$, i.e., instead of the distances used in the third practical example, the measuring angles are used to determine the vehicle lane.

This is possible only if the radar system 1 is positioned above the road, with the radar axis (main axis) being oriented in the direction of the road. Depending on the distance of the vehicle lane perpendicular to the radar axis, the vehicles enter the radar cone at a measuring angle γ with a different absolute value. As to the sign, the measuring angles γ differ depending on whether in the beam direction, they are located to the right or to the left of the radar axis.

For oncoming traffic, the measuring angle γ increases only insignificantly. In any case, each measuring angle range which is defined by a measuring angle γ as the vehicles enter into and exit from the measuring range can be linked to one vehicle only.

In contrast to the method used in the first practical example, the method according to the third or fourth practical example does not compute all data which characterize the vehicle lane in its position relative to the radar system 1. Only data that characterize the vehicle lane sufficiently so as to be able to use it as an identifying feature are computed. In this manner, it is easier and less costly to implement a device for carrying out the method.

By following the vehicle throughout its travel through the measuring range, it is possible not only to record data that characterize the vehicle lane but also to make the measurement of the speed, the measurement of the distance and optionally the measurement of the angle more plausible.

Next, several possibilities will be discussed, by means of which the values measured can be shown on the camera image (evidentiary image).

The recorded values measured which jointly characterize the lane of the infringing vehicle can be inserted in the form of pixels, e.g., in the form of points, crosses, triangles of the like or in the form of a line, a tube, a plane or the like. The insertion can be implemented by means of the use of colors or by making the relevant image areas lighter or darker. In addition, a range of tolerance can be added to the actual values measured.

The infringing vehicle can also be marked, e.g., by inserting a mask, a marker or by making the image areas surrounding the infringing vehicle darker.

In addition, the angle range through which the infringing vehicle has passed can be given, which is especially effective in cases in which the vehicles essentially pass through the measuring range in identical distance ranges. The distance range through which the infringing vehicle has passed can also be indicated by inserting a circular ring segment.

In addition to the conventional data that can be inserted for evidentiary purposes of the image, such as date, place, time of day, speed measured, speed allowance (equals the speed measured minus a tolerance), difference between the speed allowance and the permissible maximum speed, and data that identify the measuring instrument, an extracted and possibly enlarged image component of the driver and/or the license plate of the infringing vehicle can be superimposed on an unimportant part of the image.

It is also possible to insert a vehicle length and/or vehicle width computed from the values measured, which can be used as additional evidence if at the measuring location, different speed limits apply to different vehicles, e.g., passenger cars, on the one hand, and trucks and buses, on the other hand).

During the passage of the infringing vehicle, one or several images for evidentiary purposes can be taken.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

The invention claimed is:

1. A method of measuring the speed of a vehicle comprising
    directing a radar beam from a radar system at a road such that several vehicles at the same time can drive through the measuring range defined by the radar beam and so that part of the radar beam is reflected by a minimum of one vehicle;
    comparing the reflected beam portion to the radar beam directed at the road;
    deriving from said comparison measured values for the speed and the distance from the radar system linked to the vehicles;
    comparing the derived speeds to a maximum permissible speed;
    activating a camera for creating an image if a derived speed is higher than the maximum permissible speed, with the derived speed and the vehicle for which the excessive speed was derived being contained on the image;
    continuously deriving the measured values several times throughout the duration of the passage of the vehicles through the measuring range;
    assessing the plausibility of previously measured values by means of subsequently derived measured values;
    using the measured values of the distances to characterize the vehicle lanes of the reflecting vehicles relative to the distance from the radar system; and
    marking the vehicle lane of the vehicle in the image, linked to the vehicle for which the excessive speed was derived.

2. The method as claimed in claim 1 characterized in that measured values which are not confirmed as plausible are eliminated and are not used to characterize or determine the vehicle lane.

3. The method as claimed in claim 1 wherein the infringing vehicle is marked in the image in that a line representing the vehicle lane is shown to the image.

4. The method as claimed in claim 1 wherein the infringing vehicle is marked in the image in that a circular segment representing a distance range is shown in the image.

5. A method of measuring the speed of a vehicle comprising
    directing a radar beam from a radar system at a road such that several vehicles at the same time can drive through the measuring range defined by the radar beam and so that part of the radar beam is reflected by a minimum of one vehicle;
    comparing the reflected beam portion to the radar beam directed at the road;
    deriving from said comparison measured values for the speed linked to the vehicles;
    comparing the derived speeds to a maximum permissible speed;
    activating a camera for creating an image if a derived speed is higher than the maximum permissible speed, with the derived speed and the vehicle for which the excessive speed was derived being contained on the image;
    deriving measured values for measuring angles;
    continuously deriving the measured values several times throughout the duration of the passage of the vehicles through the measuring range;
    assessing the plausibility of previously measured values by means of subsequently derived measured values;

using the measured values for the measuring angles to characterize the vehicle lane of the reflecting vehicles relative to the main beam of the radar system; and marking the vehicle lane of the vehicle in the image, linked to the vehicle for which the excessive speed was derived.

6. The method as claimed in claim 1, wherein measured values for measuring angles are derived from the comparison and the measured values for the positioning angles, which were derived several times, together with the measured values for the speeds and the distance, which were derived at the same time, form a value triple by means of which the vehicle lane is determined relative to its location to the radar system.

7. The method as claimed in claim 5, wherein measured values for the distances are derived from the comparison and the measured values for the distance, which were derived several times, together with the measured values for the speed and the measuring angles, which were derived at the same time, form a value triple by means of which the vehicle lane is determined relative to its location to the radar system.

8. The method as claimed in claim 5, characterized in that measured values which are not confirmed as plausible are eliminated and are not used to characterize or determine the vehicle lane.

9. The method as claimed in claim 5, wherein determination of the individual vehicle lane takes place relative to their location to one another so as to be able to distinguish the vehicles.

10. The method as claimed in claim 5, wherein the infringing vehicle is marked in the image in that a line representing the vehicle lane is shown to the image.

11. The method as claimed in claim 5, wherein the infringing vehicle is marked in the image in that an area representing an angle range is shown in the image.

12. The method as claimed in claim 5, wherein the infringing vehicle is marked in the image in that a circular segment representing a distance range is shown in the image.

* * * * *